(12) United States Patent
Kinoshita et al.

(10) Patent No.: US 7,802,041 B2
(45) Date of Patent: Sep. 21, 2010

(54) INFORMATION PROCESSING APPARATUS INCLUDING TRANSFER DEVICE FOR TRANSFERRING REQUESTS

(75) Inventors: Takayuki Kinoshita, Kawasaki (JP); Junji Ichimiya, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 12/219,627

(22) Filed: Jul. 24, 2008

(65) Prior Publication Data
US 2009/0031064 A1    Jan. 29, 2009

(30) Foreign Application Priority Data
Jul. 25, 2007    (JP) .............................. 2007-193706

(51) Int. Cl.
*G06F 12/00* (2006.01)
*G06F 13/14* (2006.01)
*G06F 13/00* (2006.01)
*G06F 15/76* (2006.01)

(52) U.S. Cl. .................... 710/240; 710/241; 710/242; 710/243; 710/244; 710/245; 711/137; 711/141; 711/145; 712/28

(58) Field of Classification Search ......... 710/240–244; 711/137, 141, 145; 712/28
See application file for complete search history.

(56) References Cited

U.S. PATENT DOCUMENTS

| | | | |
|---|---|---|---|
| 5,500,945 A * | 3/1996 | Maeda et al. ................. | 714/56 |
| 6,067,611 A * | 5/2000 | Carpenter et al. ............. | 712/28 |
| 6,263,405 B1 * | 7/2001 | Irie et al. ..................... | 711/141 |
| 6,405,289 B1 * | 6/2002 | Arimilli et al. .............. | 711/145 |
| 6,880,046 B1 * | 4/2005 | Yokoi et al. .................. | 711/137 |
| 7,017,000 B2 * | 3/2006 | Higuchi ...................... | 710/305 |
| 2004/0186942 A1 | 9/2004 | Olarig | |

FOREIGN PATENT DOCUMENTS

| | | |
|---|---|---|
| EP | 1 296 246 | 3/2003 |
| JP | 09-006737 | 1/1997 |
| JP | 2001-318901 | 11/2001 |
| JP | 2004-072547 | 3/2004 |

OTHER PUBLICATIONS

European Search Report issued on Nov. 4, 2008 in corresponding European Patent Application No. 08159432.7.

* cited by examiner

*Primary Examiner*—Mark Rinehart
*Assistant Examiner*—Christopher A Daley
(74) *Attorney, Agent, or Firm*—Staas & Halsey LLP

(57) ABSTRACT

According to an aspect of an embodiment, an apparatus has a pair of first system boards, each of the first system boards including a processor and being adapted for sending duplicate requests, in parallel, respectively, a second system board including a processor and being adapted for sending requests, a first transfer device for transferring requests, having a first arbiter for selecting and outputting one of the duplicate requests sent from each of the first system boards, and a second arbiter for selecting and outputting one of the requests sent from the second system board and a second transfer device for transferring requests, having a third arbiter for selecting one of the duplicate requests sent from each of the first system boards and outputting the selected request in synchronization with the selected request outputted by the first arbiter, the second transfer device having a forth arbiter.

15 Claims, 8 Drawing Sheets

INFORMATION PROCESSING APPARATUS INCLUDING TRANSFER DEVICE FOR TRANSFERRING REQUESTS

BACKGROUND

The present technique relates to a transfer device, an information processing apparatus including an I/O board connected to a system board and a peripheral device and equipped with the transfer device, a method of controlling the transfer device, and a method of controlling the information processing device.

Some information processing devices have such a configuration that physically separated units are incorporated. Examples of the units include a system board equipped with a CPU (central processing unit) or a memory, and an I/O board equipped with an I/O (input/output) device for a hard disk drive or PCI (peripheral component interconnect) device. Cross bar switches including an address crossbar switch and a data crossbar switch are mounted onto the system board and the I/O board to increase a data transfer rate. The address crossbar switch functions to merge and arbitrate address requests sent from the system board or the I/O board, and functions to broadcast the merged address requests to all of the system board and the I/O board.

In such information processing apparatuses, one cashing can be divided into plural partitions where systems independently operate. Thus, the partitions have different operating systems (OS's), and plural systems can be configured in one casing.

The information processing apparatus may have mirror configuration obtained by dividing the entire system into mirror areas having the same partition configuration. However, if a system having mirror configuration and a system not having mirror configuration coexist, data cannot be synchronized because of a shared portion like the address crossbar switch. Thus, even though any system is adaptable to a partition scheme, the whole system configuration is limited to the mirror configuration or non-mirror configuration. In other words, a system composed of mirrored partitions and a system composed of partitions being not mirrored cannot coexist in the same casing.

There are Japanese Laid-open Patent Publication No. 09-006737, Japanese Laid-open Patent Publication No. 2001-318901, and Japanese Laid-open Patent Publication No. 2004-072547.

SUMMARY

According to an aspect of an embodiment, an apparatus has a pair of first system boards, each of the first system boards including a processor and being adapted for sending duplicate requests, in parallel, respectively, a second system board including a processor and being adapted for sending requests, a first transfer device for transferring requests, having a first arbiter for selecting and outputting one of the duplicate requests sent from each of the first system boards, and a second arbiter for selecting and outputting one of the requests sent from the second system board and a second transfer device for transferring requests, having a third arbiter for selecting one of the duplicate requests sent from each of the first system boards and outputting the selected request in synchronization with the selected request outputted by the first arbiter, the second transfer device having a forth arbiter for selecting and outputting one of the requests sent from the second system board.

DESCRIPTION OF THE PREFERRED EMBODIMENTS

Hereinafter, an embodiment of the present technique will be described with reference to the accompanying drawings.

EXAMPLE 1

Figure 1:
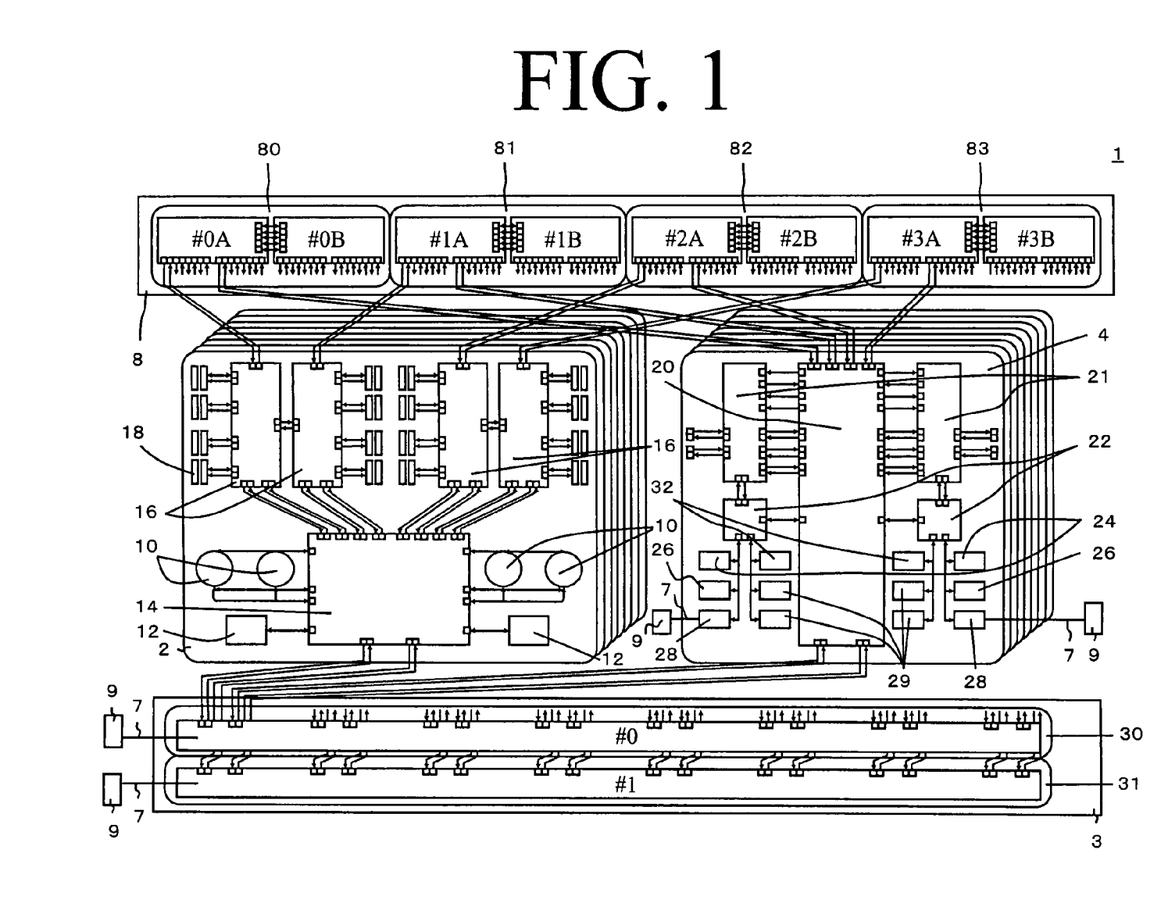
FIG. 1 shows the configuration of an information processing apparatus according to an embodiment of the present technique.

Information Processing Apparatus:

FIG. 1 shows the configuration of an information processing apparatus 1 according to the embodiment of the present technique. In the information processing apparatus according to the present embodiment, at least one system board 2 and at least one I/O (input/output) board 4 are connected to an address crossbar switch 3 and a data crossbar switch 8, respectively. In this example, the information processing apparatus 1 includes, for example, 8 system boards 2 and 8 I/O boards 4. A device management board 9 is a management unit corresponding to an SVP (service processor), which is connected to a BM (baseboard management) controller 28 of the I/O board 4 through an SM (system management) bus 7.

The address crossbar switch 3 is duplexed into an address crossbar 30 and an address crossbar 31, which control the same request at the same time. Thus, the address crossbar switch 3 realizes redundant hardware configuration. The data crossbar 8 includes four data crossbars 80, 81, 82, and 83 and capable of processing a large amount of data. The address crossbar 30 and the address crossbar 31 each include plural receiving port and transmitting ports connected to the system board 2 or the I/O board 4.

The system board 2 includes four CPUs 10, two FWHs (firmware hubs) 12, a north bridge 14, four memory switches 16, and plural memories 18 connected to each memory switch. The north bridge 14 connects each CPU and a PCI bus. Each FWH stores a BIOS (basic input output system), a POST (power on self test), or other such firmware programs. Each memory switch 16 is used for setting functions of the information processing apparatus. Each memory 18 stores various kinds of information.

The I/O board 4 includes a south bridge 20, two SERs (serializers/deserializers) 21 connected to the south bridge 20, two ICH6s (I/O controller hub 6) 22, each of the two ICH6s 22 connected to one of the SERs 21, respectively. And the I/O board 4 includes two groups of six controllers, each of the two groups of six controllers connected to one of the ICH6s 22, respectively. Examples of the controller connected to each ICH6 22 include an FWH controller 24, an SIO (serial I/O) controller 26, a BM controller 28, a LAN (local area network) adaptor 30, and a VGA (video graphics array) controller 32. The south bridge 20 connects the PCI bus with an ISA (industrial standard architecture) bus. The SER 21 converts data between a parallel interface and a serial interface. The ICH6 22 is an I/O controller hub. The FWH controller reads the BIOS, the POST, or other such programs stored in the FWH 12. The SIO controller 26 debugs a system. The BM controller 28 executes communications with the device management board 9. The LAN adaptor 30 is used for connecting the information processing apparatus to the network. The VGA controller 32 displays an image on display means (not shown) based on the VGA standards. The I/O board 4 is connectable with peripheral devices such as a hard disk device. The configuration of FIG. 1 is illustrated by way of example, and the type or number of units can be freely changed. In addition, the type or number of units can be set to an arbitrary value in each I/O board 4.

The south bridge 20 is connected to the address crossbars 30 and 31 and the data crossbars 80, 81, 82, and 83. The south bridge 20 controls the FWH controller 24, the SIO controller 26, the BM controller 28, the LAN adaptor 30, and the VGA controller 32 through the SER 21 and the ICH6 22. In the case of transferring data obtained with the FWH controller 24, the SIO controller 26, the BM controller 28, the LAN adaptor 30, or the VGA controller 32, the south bridge 20 sends an address request to the address crossbar switch 3. Further, when receiving data transferred from the system board 2 through the address crossbar switch 3, the south bridge 20 outputs the data to a corresponding controller through the SER 21 or the ICH6 22. After receiving the data, the controller stores or transmits the data.

The four CPUs 10 running on any system board 2 issue read/write commands to read/write data from/to the memory 18, any other system board 2 and I/O board 4. The commands are sent to the north bridge 14. The north bridge 14 temporarily stores the commands input from each CPU 10. Then, the north bridge 14 selects one of the input commands in order of priority and sends the selected command as an address request to the address crossbar switch 3 and the four memory switches 16.

In such an information processing apparatus, one casing can be divided into plural partitions where systems independently operate. That is, the partitions may have different OSs, and plural tasks can be executed in one casing. In this way, the system can be flexibly configured. Each partition includes at least one system board and at least one I/O board. Here, other components may be flexibly used in combination in accordance with system configuration as follows. That is, if some partition requires a lot of CPU resources or memory resources, many system boards are assigned thereto. If some partition requires a lot of I/O resources, many I/O boards are assigned thereto. Each partition is protected not to be affected by the other partitions. If a failure occurs in any partition, the other partitions are not affected thereby.

Data transferred through the address crossbar switch 3 is received by the memory switch 16 and then output to the north bridge 14. The north bridge 14 sends the data to a corresponding CPU 10. Data to be transferred to the other system boards 2 or I/O boards 4 is transferred to the address crossbar switch 3 by means of the memory switch 16.

Each system board 2 and each I/O board 4 output requests to the address crossbar switch 3 if necessary. Thus, plural requests center on the address crossbar switch 3, with the result that requests tend to remain unprocessed in plural units.

To solve this problem, the address crossbar switch 3 is provided with an arbitrating circuit (arbiter) for selecting one of the plural requests sent from different units.

An operation of the information processing apparatus of the embodiment is described below for illustrative purposes. First, the CPU issues a read command to read target data toward the north bridge. The north bridge sends an address request to the address crossbar based on the read command. The address crossbar arbitrates the received address request to broadcast the address request to all north bridges or south bridges.

All the north bridges or south bridges acquire cache information representing where the data requested by the CPU is stored based on the received address request and then, notifies the address crossbar of the cache information. The address crossbar merges the cache information to broadcast the information to all the north bridges or south bridges. The north bridge as a sender of the request finds out an area where the data requested by the CPU is stored. The north bridge requests the memory switch to send the data. The memory switch requests the data through an IO subordinate to a south bridge or memory on any other system board, and receives the data to send the data to the CPU.

Figure 2:
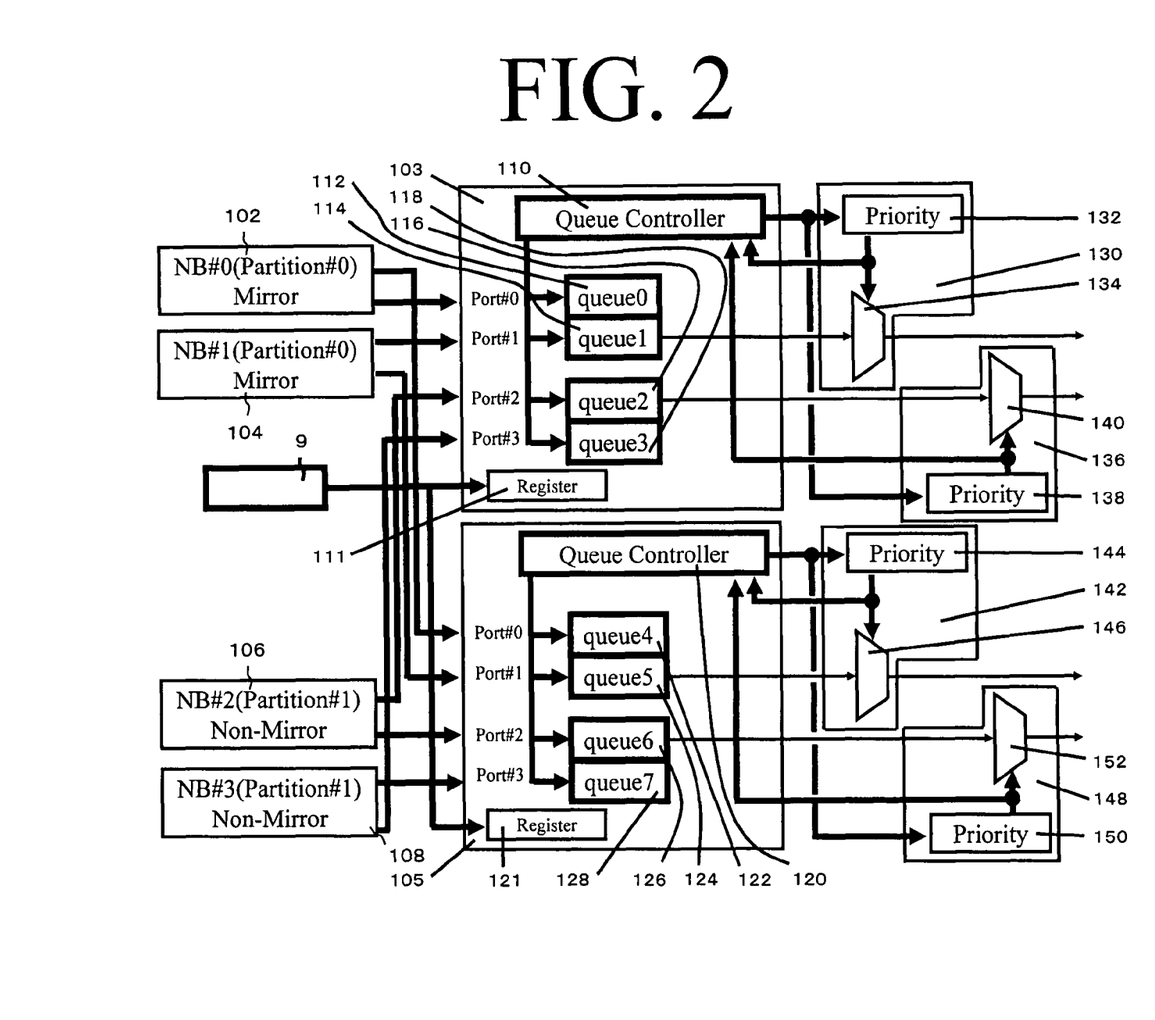
FIG. 2 is a diagram (I) showing a relationship between a queue control unit and an arbiter according to the embodiment of the present technique.

Requests sent from each system board 2 are stored in a system board module of the address crossbar 30 or in a system board module of the address crossbar 31. As shown in FIG. 2, the system board module of the address crossbar 30 includes a queue buffer unit 103 for storing requests on a unit basis. The queue buffer unit 103 includes a queue control unit 110 used for control the queue buffer 103, and "queue0" 112, "queue1" 114, "queue2" 116, and "queue3" 118 as a buffer for storing requests. In addition, the queue buffer unit 103 includes a register 111 storing information for determining whether each port has mirror configuration or non-mirror configuration. The register 111 is connected to the device management board 9. The system board module of the address crossbar 31 includes a queue buffer unit 105 for storing requests on a unit basis. The queue buffer unit 105 includes a queue control unit 120 used for control, and "queue4" 122, "queue5" 124, "queue6" 126, and "queue7" 128 as a buffer for storing requests. In addition, the queue buffer unit 103 includes a register 121 storing information for determining whether each port has mirror configuration or non-mirror configuration. The register 111 is connected to the device management board 9 for managing operations of the entire information processing apparatus 1.

The queue buffer unit 103 is connected to a mirror-configuration arbiter 130 and a non-mirror-configuration arbiter 136. The mirror-configuration arbiter 130 includes a priority logic unit 132 and a selector 134. The non-mirror-configuration arbiter 136 includes a priority logic unit 138 and a selector 140. Further, the queue buffer unit 105 is connected to a mirror-configuration arbiter 142 and a non-mirror-configuration arbiter 148. The mirror-configuration arbiter 142 includes a priority logic unit 146 and a selector 148. The non-mirror-configuration arbiter 148 includes a priority logic unit 150 and a selector 152.

The queue control unit outputs a signal representing whether a request is stored in a buffer or not to the priority logic unit. The priority logic unit specifies units where a request remains to be processed, based on the signal. Then, the priority logic unit selects one of the units in the order of priority and extracts a request of the selected unit. The selector sends a selection signal based on the selection result, and outputs the request of the selected unit. The request is sent or broadcasted to a target unit.

The priority logic unit notifies the queue control unit of the queue buffer unit corresponding to the selected unit about the selected request. In response to the notification, the queue control unit outputs the request and then, deletes the selected request. If there are plural requests in the buffer, the oldest request of the plural requests is output to the selector. As a result, only unprocessed requests are left in the buffer. If any new request is received, the request is stored in a free space of the buffer.

Figure 3:
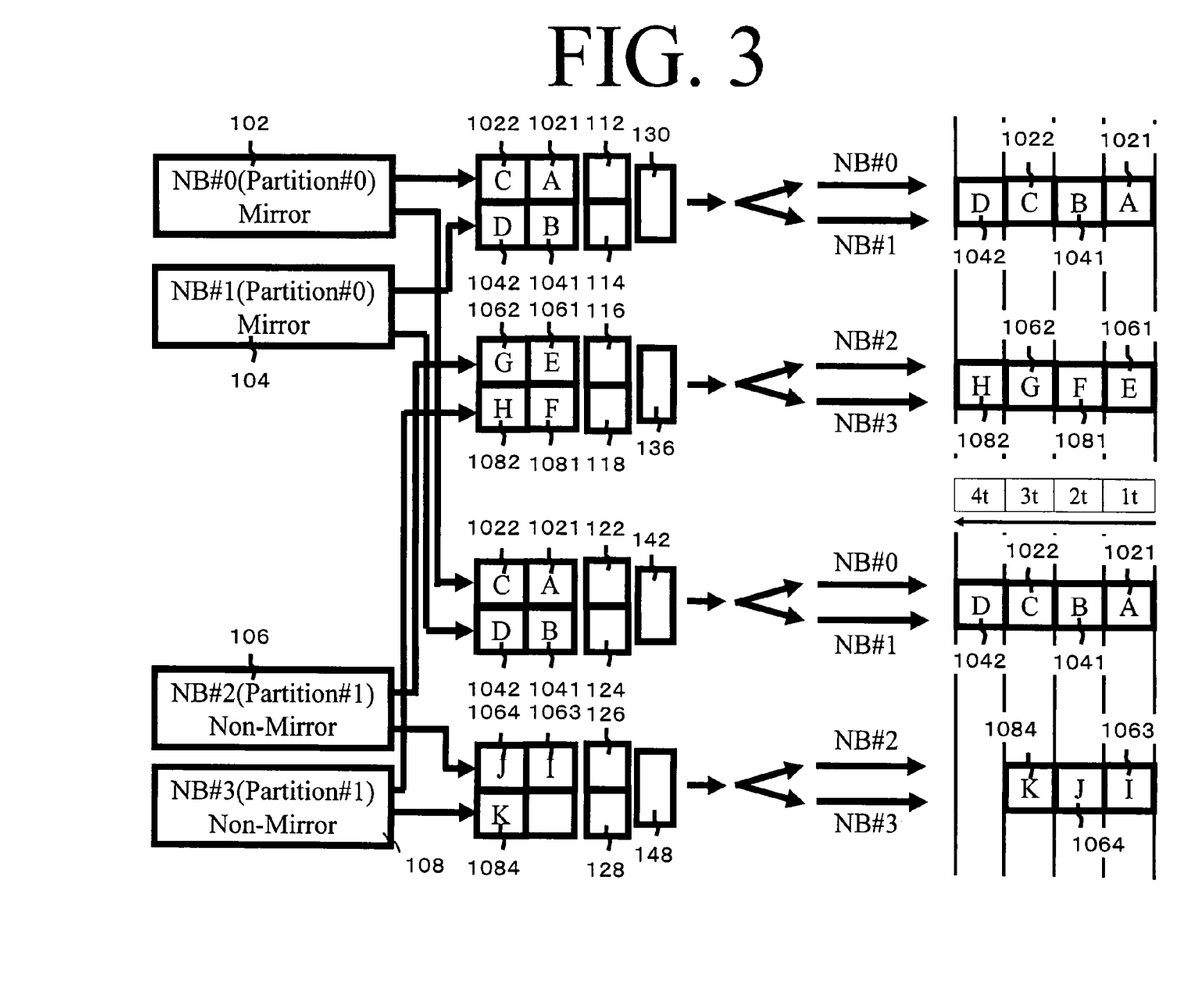
FIG. 3 is a diagram (I) showing how requests are sent out according to the embodiment of the present technique.

Arbitrating Circuit I:

FIG. 3 shows how different system boards, "NB#0" 102, "NB#1" 104, "NB#2" 106, and "NB#3" 108 send requests. The "NB#0" 102 includes a first processor and first and second ports, the "NB#1" 104 includes a second processor and third and fourth ports, the "NB#2" 106 includes a third processor and fifth and sixth ports, and "NB#3" 108 includes a fourth processor and seventh and eighth ports. The "NB#0" 102 and the "NB#1" 104 constitute "Partition#0". The "NB#2" 106 and the "NB#3" 108 constitute "Partition#1". The "NB#0" 102 and the "NB#1" 104 mirror each other. The "NB#2" 106, and the "NB#3" 108 do not mirror each other. The "NB#0" 102 and the "NB#1" 104 are a pair. The "NB#0" 102 includes a processor and is adapted for sending duplicate requests, in parallel. The "NB#1" 104 includes a processor and is adapted for sending duplicate requests, in parallel.

As shown in FIG. 3, the "NB#0" 102 of the mirror configuration duplicates a request to send the request to the arbiters 130 and 142. As shown in FIG. 3, the "NB#1" 104 of the mirror configuration duplicates a request to send the request to the arbiters 130 and 142. The requests from the mirrored "NB#0" 102 and "NB#1" 104 are stored in the "queue0" 112, the "queue1" 114, the "queue4" 122, and the "queue5" 124 through "Port#0" and "Port#1". The requests stored in the "queue0" 112 and the "queue1" 114 are input to the mirror-configuration arbiter 130 and the requests stored in the "queue4" 122 and the "queue5" 124 are input to the mirror-configuration arbiter 142. On the other hand, requests from the unmirrored "NB#2" 106 and "NB#3" 108 are stored in the "queue2" 116, the "queue3" 118, the "queue6" 126, and the "queue7" 128 through "Port#2" and "Port#3". The requests stored in the "queue2" 116 and the "queue3" 118 are input to the non-mirror-configuration arbiter 138, and the requests stored in the "queue6" 126, and the "queue7" 128 are input to the non-mirror-configuration arbiter 148. To describe numbers "0" to "7", the smaller the value, the older the request.

Figure 8:
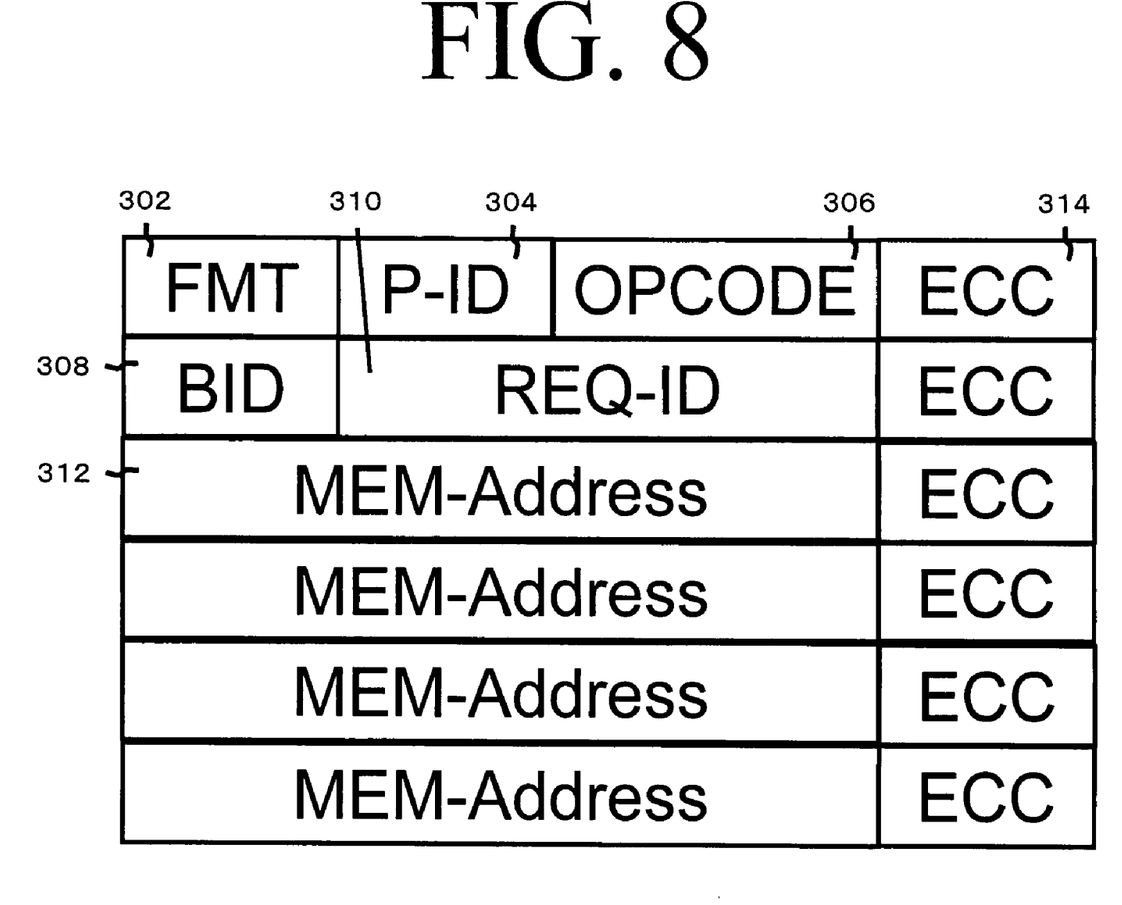
FIG. 8 shows the data structure of a request.

FIG. 8 shows an example of data structure of an address request. The address request includes an FMT (format) 302, a P-ID (partition-ID) 304, an OPCODE (operation code) 306, a BID (board ID) 308, a REQ-ID (request-ID) 310, and a MEM-Address (memory-address) 312. Each data is added with an ECC (error correcting code) 314. The FMT 302 represents validity and length of a packet. The P-ID 304 represents a partition number. The OPCODE 306 represents a number of a command to cause the CPU to perform processing. The BID 308 is used for identifying a system board number. The BID 308 represents a target (destination) system board. The REQ-ID 310 represents a request number. The MEM-Address 312 is used for specifying a memory area. The ECC 314 is used for protecting data from 1-bit errors. Upon reading data, an error can be detected by comparing an ECC generated based on the data with the ECC 314 previously added to the data.

Mirror-Configuration Arbiter I:

The mirror-configuration arbiter 130 is described next. The priority logic unit 132 notifies the queue control unit 110 of the queue buffer unit 103 about a selected request. In response to the notification, the queue control unit 110 outputs the request and then deletes the request. If there are plural requests in the buffer, the oldest request of the plural requests is output to the selector 134. As a result, only unprocessed requests are left in the buffer. If any new request is received, the request is stored in a free space of the buffer. The mirror-configuration arbiter 130 selects one of the duplicate requests sent from the "NB#0" 102 and "NB#1" 104.

First, the priority logic unit 132 outputs a "request A" 1021 to the selector 134. When receiving a command from the priority logic unit 132, the selector 134 outputs the "request A" 1021. The priority logic unit 132 notifies the queue control unit 110 of the queue buffer unit 103 that the "request A" 1021 is selected. The priority logic unit 132 gives the lowest priority to a sender of the "request A" 1021 and gives the highest priority to a sender of a "request B" 1041. The queue control unit 110 deletes the "request A" 1021. Since the "request A" 1021 stored in the "queue0" 112 is deleted, a "request C" 1022 sent from the "NB#0" 102 is newly stored in the "queue0" 112. Then, the remaining and oldest request, "request B" 1041 is sent to the selector 134. The selector 134 outputs the "request B" 1041 in response to a command from the priority logic unit 132.

The priority logic unit 132 notifies the queue control unit 110 of the queue buffer unit 103 corresponding to the unit whose request is selected, that the "request B" 1041 is selected. The queue control unit 110 deletes the "request B" 1041. Since the "request B" 1041 stored in the "queue1" 114 is deleted, a "request D" 1042 sent from the "NB#1" 104 is stored in the "queue1" 114.

Similarly, in subsequent operations, the priority logic unit 132 outputs the "request C" 1022 to the selector 134. The selector 134 outputs the "request C" 1022 in response to a command from the priority logic unit 132. The priority logic unit 132 notifies the queue control unit 110 of the queue buffer unit 103 corresponding to the unit whose request is selected, that the "request C" 1022 is selected. The queue control unit 110 deletes the "request C" 1022. The priority logic unit 132 gives the lowest priority to a sender of the "request C" 1022 and gives the highest priority to a sender of the "request D" 1042 Since the "request C" 1022 stored in the "queue0" 112 is deleted, a request sent from the "NB#0" 102 is newly stored in the "queue0" 112. Then, the remaining and oldest request, "request D" 1042 is sent to the selector 134. The selector 134 outputs the "request D" 1042 in response to a command from the priority logic unit 132. Since the "request D" 1042 stored in the "queue1" 114 is deleted, a "request" sent from the "NB#1" 104 is newly stored in the "queue1" 114.

As shown in FIG. 3, the mirror-configuration arbiter 130 outputs the "request A" 1021 to the "NB#0" 102 at time it, outputs the "request B" 1041 to the "NB#1" 104 at time $2t$, outputs the "request C" 1022 to the "NB#0" 102 at time $3t$, and outputs the "request D" 1042 to the "NB#1" 104 at time $4t$.

Non-Mirror-Configuration Arbiter I:

The non-mirror-configuration arbiter 136 is described next. The priority logic unit 138 notifies the queue control unit 110 of the queue buffer unit 103 about the selected request. In responds to the notification, the queue control unit 110 outputs the request and then, deletes the selected request. If there are plural requests in the buffer, the oldest request of the plural requests is output to the selector 140.

First, the priority logic unit 138 outputs a "request E" 1061 to the selector 140. When receiving a command from the priority logic unit 138, the selector 140 outputs the "request E" 1061. The priority logic unit 138 notifies the queue control unit 110 of the queue buffer unit 103 that the "request E" 1061 is selected. The priority logic unit 138 gives the lowest priority to a sender of the "request E" 1061 and gives the highest priority to a sender of a "request F" 1081. The queue control unit 110 deletes the "request E" 1061. Since the "request E" 1061 stored in the "queue2" 116 is deleted, a "request G" 1062 sent from the "NB#2" 106 is newly stored in the "queue2" 116. Then, the remaining and oldest request, "request F" 1081 is sent to the selector 140. The selector 140 outputs the "request F" 1081 in response to a command from the priority logic unit 138.

The priority logic unit 138 notifies the queue control unit 110 of the queue buffer unit 103 corresponding to the unit whose request is selected, that the "request F" 1081 is selected. The queue control unit 110 deletes the "request F" 1081. Since the "request F" 1081 stored in the "queue1" 114 is deleted, a "request H" sent from the "NB#3" 108 is stored in the "queue3" 118.

Similarly, in subsequent operations, the priority logic unit 138 outputs the "request G" 1082 to the selector 140. The selector 140 outputs the "request G" 1062 in response to a command from the priority logic unit 138. The priority logic unit 138 notifies the queue control unit 110 of the queue buffer unit 103 corresponding to the unit whose request is selected, that the "request G" 1062 is selected. The queue control unit 110 deletes the "request G" 1062. The priority logic unit 138 gives the lowest priority to a sender of the "request G" 1062 and gives the highest priority to a sender of the "request H" 1082. Since the "request G" 1062 stored in the "queue2" 116 is deleted, a "request" sent from the "NB#2" 106 is newly stored in the "queue2" 116. Then, the remaining and oldest request, "request H" 1082 is sent to the selector 140. The selector 140 outputs the "request H" 1082 in response to a command from the priority logic unit 138. Since the "request H" 1082 stored in the "queue3" 118 is deleted, a "request" sent from the "NB#3" 108 is newly stored in the "queue3" 118.

As shown in FIG. 3, the non-mirror-configuration arbiter 136 outputs the "request E" 1061 to the "NB#2" 106 at time 1t, outputs the "request F" 1081 to the "NB#3" 108 at time 2t, outputs the "request G" 1062 to the "NB#2" 106 at time 3t, and outputs the "request H" 1082 to the "NB#3" 108 at time 4t.

Mirror-Configuration Arbiter II:

The mirror-configuration arbiter 142 is described next. The priority logic unit 144 notifies the queue control unit 120 of the queue buffer unit 105 about a selected request. In response to the notification, the queue control unit 120 outputs the request and then deletes the request. If there are plural requests in the buffer, the oldest request of the plural requests is output to the selector 146. The mirror-configuration arbiter 142 selects one of the duplicate requests sent from the "NB#0" 102 and "NB#1" 104. The mirror-configuration arbiter 142 outputs the request outputted by the mirror-configuration arbiter 142 in synchronization with the selected request outputted by the mirror-configuration arbiter 130.

First, the priority logic unit 144 outputs the "request A" 1021 to the selector 146. When receiving a command from the priority logic unit 144, the selector 146 outputs the "request A" 1021. The priority logic unit 144 notifies the queue control unit 120 of the queue buffer unit 105 that the "request A" 1021 is selected. The priority logic unit 144 gives the lowest priority to a sender of the "request A" 1021 and gives the highest priority to a sender of the "request B" 1041. The queue control unit 120 deletes the "request A" 1021. Since the "request A" 1021 stored in the "queue4" 122 is deleted, the "request C" 1022 sent from the "NB#0" 102 is newly stored in the "queue4" 122. Then, the remaining and oldest request, "request B" 1041 is sent to the selector 134. The selector 146 outputs the "request B" 1041 in response to a command from the priority logic unit 144.

The priority logic unit 144 notifies the queue control unit 120 of the queue buffer unit 105 corresponding to the unit whose request is selected, that the "request B" 1041 is selected. The queue control unit 120 deletes the "request B" 1041. Since the "request B" 1041 stored in the "queue5" 124 is deleted, the "request D" sent from the "NB#1" 104 is stored in the "queue5" 124.

Similarly, in subsequent operations, the priority logic unit 144 outputs the "request C" 1022 to the selector 146. The selector 146 outputs the "request C" 1022 in response to a command from the priority logic unit 144. The priority logic unit 144 notifies the queue control unit 120 of the queue buffer unit 105 corresponding to the unit whose request is selected, that the "request C" 1022 is selected. The queue control unit 120 deletes the "request C" 1022. The priority logic unit 144 gives the lowest priority to a sender of the "request C" 1022 and gives the highest priority to a sender of the "request D" 1042. Since the "request C" 1022 stored in the "queue0" 112 is deleted, a "request" sent from the "NB#0" 102 is newly stored in the "queue4" 122. Then, the remaining and oldest request, "request D" 1042 is sent to the selector 146. The selector 146 outputs the "request D" 1042 in response to a command from the priority logic unit 144. Since the "request D" 1042 stored in the "queue5" 124 is deleted, a "request" sent from the "NB#1" 104 is newly stored in the "queue5" 124.

As shown in FIG. 3, the mirror-configuration arbiter 142 outputs the "request A" 1021 to the "NB#0" 102 at time 1t, outputs the "request B" 1041 to the "NB#1" 104 at time 2t, outputs the "request C" 1022 to the "NB#0" 102 at time 3t, and outputs the "request D" 1042 to the "NB#1" 104 at time 4t. With these settings, the mirror-configuration arbiters 130 and 142 can output requests to the mirrored "NB#0" 102 and "NB#1" 104 in sync with each other.

Non-Mirror-Configuration Arbiter II:

The non-mirror-configuration arbiter 148 is described next.

The priority logic unit 150 notifies the queue control unit 120 of the queue buffer unit 105 about the selected request. In responds to the notification, the queue control unit 120 outputs the request and then, deletes the selected request. If there are plural requests in the buffer, the oldest request of the plural requests is output to the selector 140.

First, the priority logic unit 150 outputs a "request I" 1063 to the selector 152. When receiving a command from the priority logic unit 150, the selector 152 outputs the "request I" 1063. The priority logic unit 152 notifies the queue control unit 120 of the queue buffer unit 105 that the "request I" 1063 is selected. The priority logic unit 150 gives the lowest priority to a sender of the "request I" 1063. The queue control unit 120 deletes the "request I" 1063. Since the "request I" 1063 stored in the "queue6" 126 is deleted, a "request J" 1064 sent from the "NB#2" 106 is newly stored in the "queue6" 126.

In this example, no request is sent from the "NB#3" 108 to the "queue7" 128. Thus, the priority logic unit 150 notifies the queue control unit 120 of the queue buffer unit 105 that no request is stored in the "queue7" 128. The queue control unit 120 newly stores a "request" 1084 sent from the "NB#3" 108 in the "queue7" 128.

Similarly, in subsequent operations, the priority logic unit 150 outputs the "request J" 1064 to the selector 152. The selector 152 outputs the "request J" 1064 in response to a command from the priority logic unit 150. The priority logic unit 150 notifies the queue control unit 120 of the queue buffer unit 105 corresponding to the unit whose request is selected, that the "request J" 1064 is selected. The queue control unit 120 deletes the "request J" 1064. The priority logic unit 150 gives the lowest priority to a sender of the "request J" 1064 and gives the highest priority to a sender of the "request K" 1084. Since the "request J" 1064 stored in the "queue6" 126 is deleted, a "request" sent from the "NB#2" 106 is newly stored in the "queue6" 126. Then, the remaining and oldest request, "request K" 1084 is sent to the selector 140. The selector 140 outputs the "request K" 1084 in response to a command from the priority logic unit 150. Since the "request K" 1084 stored in the "queue7" 128 is deleted, a "request" sent from the "NB#3" 108 is newly stored in the "queue7" 128.

As shown in FIG. 3, the non-mirror-configuration arbiter 148 outputs the "request I" 1063 to the "NB#2" 106 at time it, outputs the "request J" 1064 to the "NB#3" 108 at time 2t, and outputs the "request K" 1084 to the "NB#2" 106 at time 3t.

With these settings, the information processing apparatus is provided with the mirror-configuration arbiter and the non-mirror-configuration arbiter, so requests from mirrored partitions can be output in sync with each other. Thus, in the information processing apparatus, mirrored partitions and un-mirrored partitions can coexist. Hence, partitions that put emphasis on reliability rather than performance may have the mirror configuration, and partitions that put emphasis on performance rather than reliability may have the non-mirror configuration. Such a system having the mirror configuration and the non-mirror configuration is useful for plural users. That is, mirrored partitions may be provided to a user who places emphasis on reliability, and unmirrored partitions may be provided to a user who places emphasis on performance.

In this example, the "NB#0" to "NB#3" are system boards but may be I/O boards.

EXAMPLE 2

In Example 1, the information processing apparatus is provided with the mirror-configuration arbiter and the non-mirror-configuration arbiter, so the mirrored partitions and the unmirrored partitions can coexist in the information processing apparatus. However, other configuration may be adopted.

Requests sent from each system board 2 are stored in a system board module of the address crossbar 30 or in a system board module of the address crossbar 31. As shown in FIG. 2, the system board module of the address crossbar 30 includes a queue buffer unit 203 for storing requests on a unit basis. The queue buffer unit 203 includes a queue control unit 210 used for control, and "queue0" 212, "queue1" 214, "queue2" 216, and "queue3" 218 as a buffer for storing requests. The system board module of the address crossbar 31 includes a queue buffer unit 205 for storing requests on a unit basis. The queue buffer unit 205 includes the queue control unit 120 used for control, and "queue4" 222, "queue5" 224, "queue6" 226, and "queue7" 228 as a buffer for storing requests.

The queue buffer unit 203 is connected to a TSS (time sharing system) arbiter 230, and the queue buffer unit 205 is connected to a TSS arbiter 232. The TSS arbiter is time-sharing arbitrating means. The TSS arbiters 230 and 232 are described later.

Figure 4:
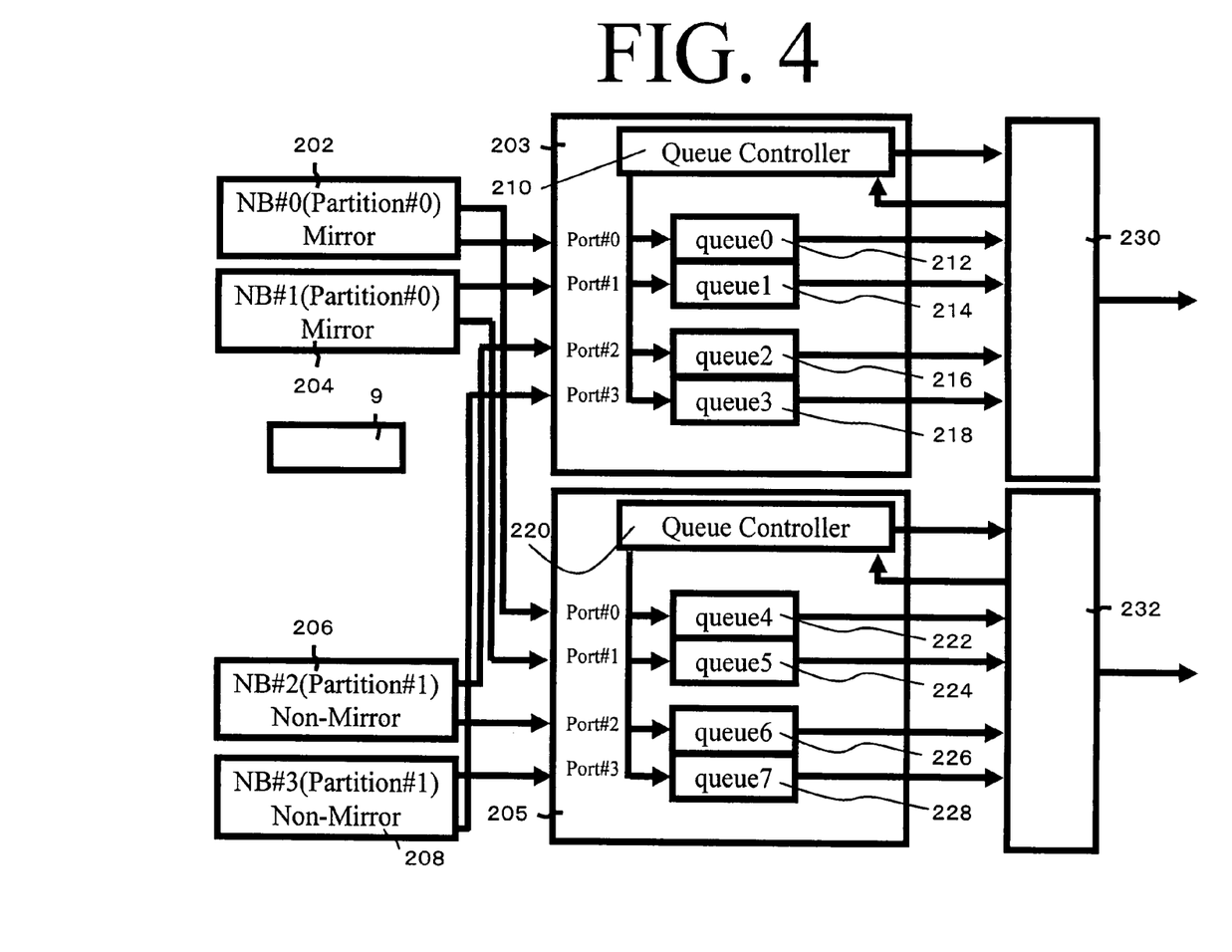
FIG. 4 is a diagram (II) showing a relationship between a queue control unit and an arbiter according to the embodiment of the present technique.

Arbitrating Circuit II:

FIG. 4 shows how different system boards, "NB#0" 202, "NB#1" 204, "NB#2" 206, and "NB#3" 208 send requests. The "NB#0" 202 includes a first processor and first and second ports, the "NB#1" 204 includes a second processor and third and fourth ports, the "NB#2" 206 includes a third processor and fifth and sixth ports, and "NB#3" 208 includes a fourth processor and seventh and eighth ports. The "NB#0" 202 and the "NB#1" 204 constitute "Partition#0". The "NB#2" 206 and the "NB#3" 208 constitute "Partition#1". The "NB#0" 202 and the "NB#1" 204 mirror each other. The "NB#2" 206, and the "NB#3" 208 do not mirror each other.

Figure 7:
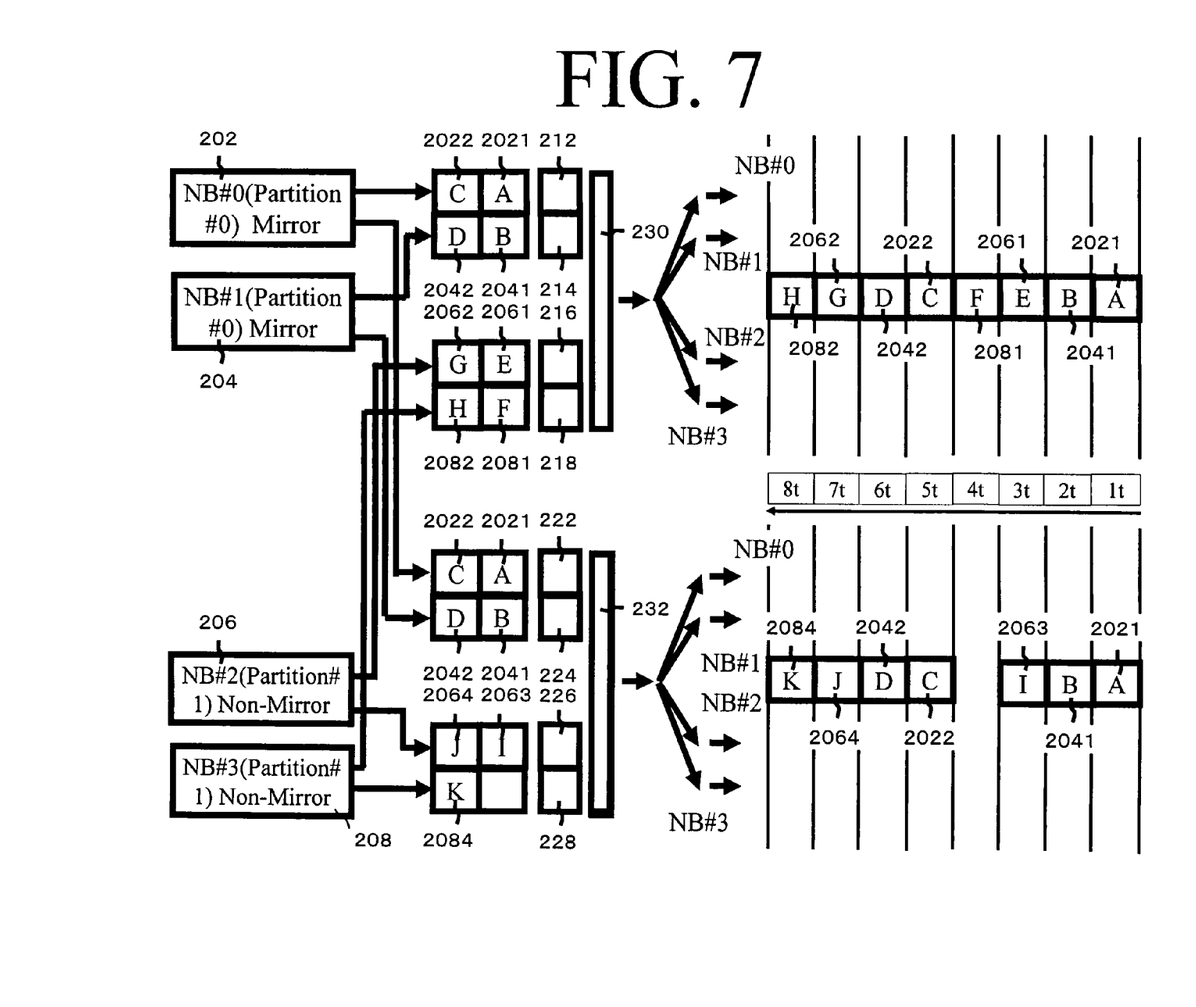
FIG. 7 is a diagram (II) showing how requests are sent out according to the embodiment of the present technique.

As shown in FIG. 7, the "NB#0" 202 of the mirror configuration duplicates a request to send the request to the arbiters 230 and 232. As shown in FIG. 7, the "NB#1" 204 of the mirror configuration duplicates a request to send the request to the arbiters 230 and 232.

The requests from the mirrored "NB#0" 202 and "NB#1" 204 are stored in the "queue0" 212, the "queue1" 214, the queue4" 222, and the "queue5" 224 through the "Port#0" and the "Port#1". On the other hand, requests from the unmirrored "NB#2" 206 and "NB#3" 208 are stored in the "queue2" 216, the "queue3" 218, the "queue6" 226, and the "queue7" 228 through the "Port#2" and the "Port#3". The requests stored in the "queue0" 212, the "queue1" 214, the "queue2" 216, and the "queue3" 218 are input to the TSS arbiter 230, and the requests stored in the "queue4" 222, the "queue5" 224, the "queue6" 226, and the "queue7" 228 are input to the TTS arbiter 232.

Figure 5:
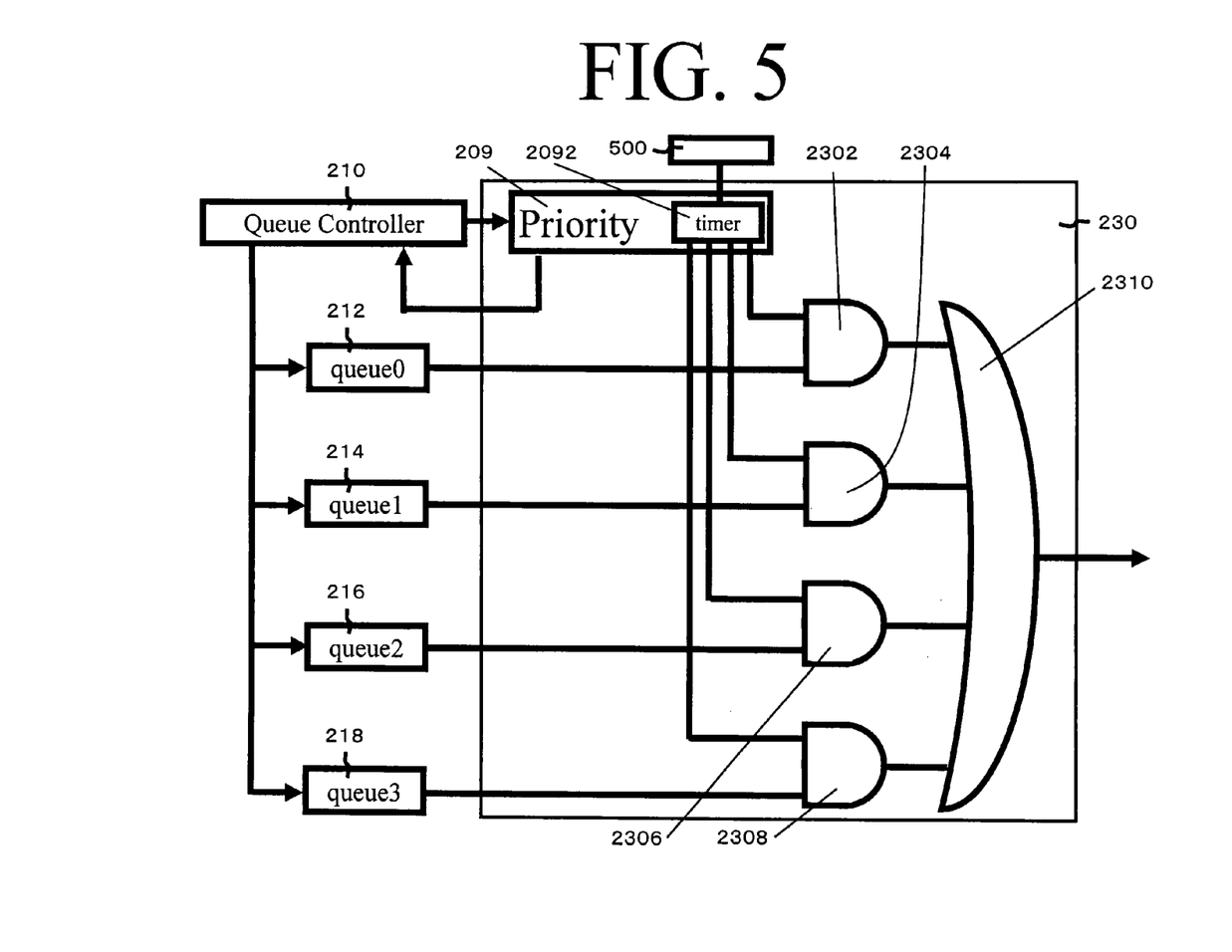
FIG. 5 is a diagram (I) showing the configuration of an arbiter according to the embodiment of the present technique.

TSS Arbiter I:

The TSS arbiter 230 is described next. FIG. 5 shows the TSS arbiter 230. The TSS arbiter 230 includes a priority logic unit 209, AND circuits 2302, 2304, 2306, and 2308, and an OR circuit 2310. The priority logic unit 209 includes a timer 2092. The timer 2092 is connected to a synchronous reset signal generation circuit (timer means) 500 in the information processing apparatus 1. The synchronous reset signal generation circuit 500 generates a reset signal at the time of the first packet detection. The synchronous reset signal generation circuit 500 outputs the reset signal to the timer 2092 and a timer 2192 as described below. As a result, the TSS arbiters 230 and 232 can output requests in sync with each other. The timer 2092 sends signals to the AND circuit at regular intervals. Further, the AND circuit 2302 is connected to the "queue0" 212, the AND circuit 2304 is connected to the "queue1" 214, the AND circuit 2306 is connected to the "queue2" 216, and the AND circuit 2308 is connected to the "queue3" 218. Outputs of the AND circuits 2302, 2304, 2306, and 2308 are connected to the OR circuit 2310.

The priority logic unit 209 notifies the queue control unit 210 of the queue buffer unit 205 about the selected request. In responds to the notification, the queue control unit 210 outputs the request and then, deletes the selected request. If there are plural requests in the buffer, the oldest request of the plural requests is output to the AND circuit. As a result, only unprocessed requests are left in the buffer. If any new request is received, the request is stored in a free space of the buffer.

In this example, when the "queue0" 212 outputs a "request A" 2021 to the AND circuit 2302, the AND circuit 2302 receives the "request A" 2021 from the "queue0" 212. Then, if receiving the "request A" 2021 from the "queue0" 212 and a signal from the timer 2092, the AND circuit 2302 outputs the "request A" 2021 to the OR circuit 2310. The OR circuit 2310 outputs the "request A" 2021 received from the AND circuit 2302. The priority logic unit 209 notifies the queue control unit 210 of the queue buffer unit 205 corresponding to a unit whose request is selected, that the "request A" 2021 is selected. The queue control unit 210 deletes the "request A" 2021. Since the "request A" 2021 stored in the "queue0" 212 is deleted, a "request C" 2022 sent from the "NB#0" 202 is newly stored in the "queue0" 212. Then, the remaining and oldest request, "request B" 2041 is sent to the AND circuit 2304. If receiving the "request B" 2041 from the "queue1" 214 and a signal from the timer 2092, the AND circuit 2304 outputs the "request B" 2041 to the OR circuit 2310. The OR circuit 2310 outputs the "request B" 2041 received from the AND circuit 2304. Similarly, in subsequent operations, the priority logic unit 209 notifies the queue control unit 210 of the queue buffer unit 205 corresponding to a unit whose request is selected, that the "request B" 2041 is selected. The queue control unit 210 deletes the "request B" 2041. Since the "request B" 2041 stored in the "queue1" 214 is deleted, a "request D" 2042 sent from the "NB#1" 204 is newly stored in the "queue1" 214.

When the "queue2" 216 outputs a "request E" 2061 to the AND circuit 2306, the AND circuit 2306 receives the "request E" 2061 from the "queue2" 216. Then, if receiving the "request E" 2061 from the "queue2" 216 and a signal from the timer 2092, the AND circuit 2306 outputs the "request E" 2061 to the OR circuit 2310. The OR circuit 2310 outputs the "request E" 2061 received from the AND circuit 2306. The priority logic unit 209 notifies the queue control unit 210 of the queue buffer unit 205 corresponding to a unit whose request is selected, that the "request E" 2061 is selected. The queue control unit 210 deletes the "request E" 2061. Since the "request E" 2061 stored in the "queue2" 216 is deleted, a "request G" 2062 sent from the "NB#2" 206 is newly stored in the "queue2" 216. Then, the remaining and oldest request, "request F" 2081 is sent to the AND circuit 2308. If receiving the "request F" 2081 from the "queue3" 218 and a signal from the timer 2092, the AND circuit 2308 outputs the "request F" 2081 to the OR circuit 2310. The OR circuit 2310 outputs the "request F" 2081 received from the AND circuit 2308. Similarly, in subsequent operations, the priority logic unit 209 notifies the queue control unit 210 of the queue buffer unit 205 corresponding to a unit whose request is selected, that the "request F" 2081 is selected. The queue control unit 210 deletes the "request F" 2081. Since the "request F" 2081 stored in the "queue3" 218 is deleted, a "request H" 2082 sent from the "NB#3" 208 is newly stored in the "queue3" 218.

As shown in FIG. 7, the TSS arbiter 230 outputs the "request A" 2021 to the "NB#0" 202, the "NB#1" 204, "NB#2" 206 and "NB#3" 208 at time t, outputs the "request B" 2041 to the "NB#0" 202, the "NB#1" 204, "NB#2" 206 and "NB#3" 208 at time 2t, outputs the "request E" 2061 to the "NB#0" 202, the "NB#1" 204, "NB#2" 206 and "NB#3" 208 at time 3t, and outputs the "request F" 2081 to the "NB#0" 202, the "NB#1" 204, "NB#2" 206 and "NB#3" 208 at time 4t. Further, the TSS arbiter 230 outputs the "request C" 2022 to the "NB#0" 202, the "NB#1" 204, "NB#2" 206 and "NB#3" 208 at time 5t, outputs the "request D" 2042 to the "NB#0" 202, the "NB#1" 204, "NB#2" 206 and "NB#3" 208 at time 6t, outputs the "request G" 2062 to the "NB#0" 202, the "NB#1" 204, "NB#2" 206 and "NB#3" 208 at time 7t, and outputs the "request H" 2082 to the "NB#0" 202, the "NB#1" 204, "NB#2" 206 and "NB#3" 208 at time 8t.

Figure 6:
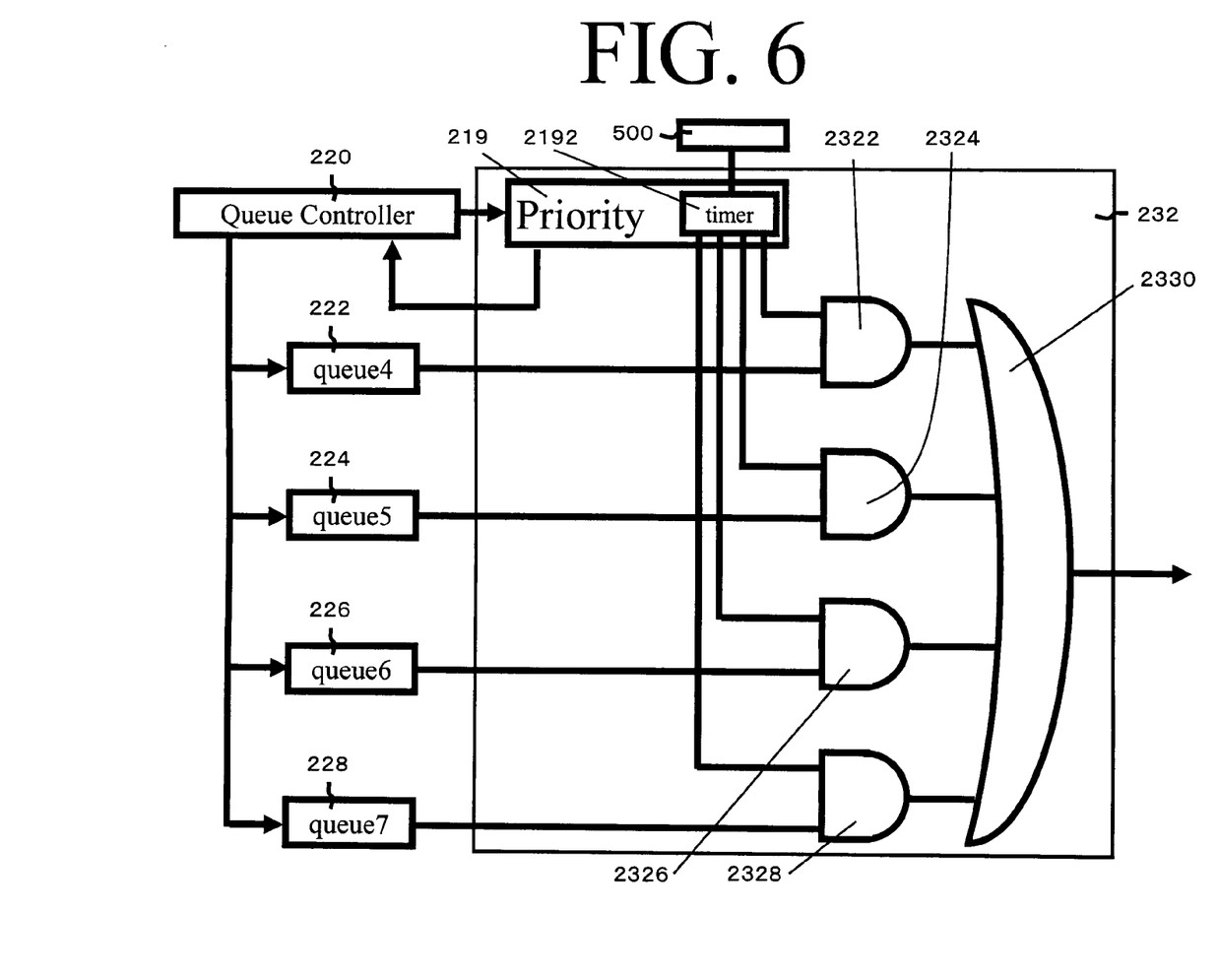
FIG. 6 is a diagram (II) showing the configuration of an arbiter according to the embodiment of the present technique.

TSS Arbiter II:

The TSS arbiter 232 is described next. FIG. 6 shows the TSS arbiter 232. The TSS arbiter 232 includes a priority logic unit 219, AND circuits 2322, 2324, 2326, and 2328, and an OR circuit 2330. The priority logic unit 219 includes a timer 2192. The timer 2192 is connected to the synchronous reset signal generation circuit 500 in the information processing apparatus 1. The synchronous reset signal generation circuit 500 generates a reset signal at the time of the first packet detection. The synchronous reset signal generation circuit 500 outputs the reset signal to the timer 2192 and the timer 2092 as described above with reference to FIG. 5. As a result, the TSS arbiters 230 and 232 can output requests in sync with each other. The timer 2192 sends signals to the AND circuit at regular intervals. Further, the AND circuit 2322 is connected to the "queue4" 222, the AND circuit 2324 is connected to the "queue5" 224, the AND circuit 2326 is connected to the "queue6" 226, and the AND circuit 2328 is connected to the "queue7" 228. Outputs of the AND circuits 2322, 2324, 2326, and 2328 are connected to the OR circuit 2330.

The priority logic unit 219 notifies the queue control unit 210 of the queue buffer unit 205 about the selected request. In responds to the notification, the queue control unit 210 outputs the request and then, deletes the selected request. If there are plural requests in the buffer, the oldest request of the plural requests is output to the AND circuit. As a result, only unprocessed requests are left in the buffer. If any new request is received, the request is stored in a free space of the buffer.

In this example, when the "queue4" 222 outputs a "request A" 2021 to the AND circuit 2322, the AND circuit 2322 receives the "request A" 2021 from the "queue4" 222. Then, if receiving the "request A" 2021 from the "queue4" 222 and a signal from the timer 2192, the AND circuit 2322 outputs the "request A" 2021 to the OR circuit 2330. The OR circuit 2330 outputs the "request A" 2021 received from the AND circuit 2322. The priority logic unit 219 notifies the queue control unit 210 of the queue buffer unit 205 corresponding to a unit whose request is selected, that the "request A" 2021 is selected. The queue control unit 210 deletes the "request A" 2021. Since the "request A" 2021 stored in the "queue4" 222 is deleted, the "request C" 2022 sent from the "NB#0" 202 is newly stored in the "queue4" 222. Then, the remaining and oldest request, "request B" 2041 is sent to the AND circuit 2324. If receiving the "request B" 2041 from the "queue5" 224 and a signal from the timer 2192, the AND circuit 2324 outputs the "request B" 2041 to the OR circuit 2330. The OR circuit 2330 outputs the "request B" 2041 received from the AND circuit 2324. Similarly, in subsequent operations, the priority logic unit 219 notifies the queue control unit 210 of the queue buffer unit 205 corresponding to a unit whose request is selected, that the "request B" 2041 is selected. The queue control unit 210 deletes the "request B" 2041. Since the "request B" 2041 stored in the "queue5" 224 is deleted, the "request D" 2042 sent from the "NB#1" 204 is newly stored in the "queue5" 224.

In this example, when the "queue6" 226 outputs a "request I" 2063 to the AND circuit 2326, the AND circuit 2326 receives the "request I" 2063 from the "queue6" 226. Then, if receiving the "request I" 2063 from the "queue6" 226 and a signal from the timer 2192, the AND circuit 2326 outputs the "request I" 2063 to the OR circuit 2330. The OR circuit 2330 outputs the "request I" 2063 received from the AND circuit 2326. The priority logic unit 219 notifies the queue control unit 210 of the queue buffer unit 205 corresponding to a unit whose request is selected, that the "request I" 2063 is selected. The queue control unit 210 deletes the "request I" 2063. Since the "request I" 2063 stored in the "queue6" 226 is deleted, a "request J" 2064 sent from the "NB#2" 206 is newly stored in the "queue6" 226. In this example, no request is sent from the "NB#3" 208, and no request is stored in the "queue7" 228. Thus, if receiving a signal from the timer 2192, the AND circuit 2326 receives no request and thus outputs no request to the OR circuit 2330. Hence, if the buffer stores no request, the TSS arbiter 232 can output the next request after a certain period of time, not at once. Therefore, requests from the mirrored "NB#0" 202 and "NB#1" 204 can be output in sync with each other. Similarly, in subsequent operations, the priority logic unit 209 newly stores a "request" 2084 sent from the "NB#3" 208 in the "queue7" 228.

As shown in FIG. 7, the TSS arbiter 232 outputs the "request A" 2021 to the "NB#0" 202, the "NB#1" 204, "NB#2" 206 and "NB#3" 208 at time 1t, outputs the "request B" 2041 to the "NB#0" 202, the "NB#1" 204, "NB#2" 206 and "NB#3" 208 at time 2t, outputs the "request I" 2063 to the "NB#0" 202, the "NB#1" 204, "NB#2" 206 and "NB#3" 208 at time 3t, and outputs no request at time 4t. Further, the TSS arbiter 230 outputs the "request C" 2022 to the "NB#0" 202, the "NB#1" 204, "NB#2" 206 and "NB#3" 208 at time 5t, outputs the "request D" 2042 to the "NB#0" 202, the "NB#1" 204, "NB#2" 206 and "NB#3" 208 at time 6t, outputs the "request J" 2064 the "NB#0" 202, the "NB#1" 204, "NB#2" 206 and "NB#3" 208 at time 7t, and outputs the "request K" 2084 to the "NB#0" 202, the "NB#1" 204, "NB#2" 206 and "NB#3" 208 at time 8t.

According to the embodiment of the present technique, the information processing apparatus is provided with an arbitrating circuit for arbitrating data sent from the system having the mirror configuration and an arbitrating circuit for arbitrating data sent from the system not having the mirror configuration. Thus, data can be synchronously processed in the system having the mirror configuration, and the system having the mirror configuration and the system not having the mirror configuration can coexist in one casing.

Further, in the above examples, the "NB#0" to "NB#3" are system boards but may be I/O boards.

The above description is given for the purpose of facilitating the understanding of the embodiment of the present technique and thus should not be construed as limiting the embodiment. Accordingly, the embodiment of the present technique can be modified within the scope of the present technique. The above embodiment describes how to process requests from two mirrored north bridges and two unmirrored north bridges. However, the numbers of mirrored north bridges and unmirrored north bridges can be arbitrarily set. In this case, the numbers of buffers, mirror-configuration arbiters, and non-mirror-configuration arbiters may be determined in accordance with the numbers of mirrored north bridges and unmirrored north bridges.

What is claimed is:

1. An apparatus comprising:
a plurality of first system boards, each of the first system boards including a first port, a second port, and a first processor that sends a first request through the first port and a second request identical to the first request through the second port respectively, and each of the first system boards is mirrored;
a plurality of second system boards, each of the second system boards including a third port, a fourth port, and a second processor that seconds a third request through either of the third port and fourth ports, and the second system boards are not mirrored;
a first transfer device, connected to the first port of each of the first system boards and the third port of each of the second system boards, having a first arbiter that selectively receives the first request sent from the first port of one of the first system boards, and that outputs the received first request to at least one of the first ports of the first system boards, and a second arbiter that selectively receives the third request sent from the third ports of the second system boards and that outputs the received third request to at least one of the third ports of the second system boards; and
a second transfer device, connected to the second ports of the first system boards and the fourth ports of the second system boards, having a third arbiter that selectively receives the second request sent from the second port of the one of the first system boards and that outputs the received second request to at least one of the second ports of the first system boards in synchronization with the first request outputted from the first arbiter, and a fourth arbiter that selectively receives the third request sent from the fourth ports of the second system boards and that outputs the received third request to at least one of the fourth ports of the second system boards.

2. The apparatus of claim 1, wherein the first arbiter outputs the request selected by the first arbiter to the mirrored first system boards.

3. The apparatus of claim 2, wherein the mirrored first system boards constitute a mirrored partition.

4. The apparatus of claim 2, wherein the second system boards constitute a non-mirrored partition.

5. The apparatus of claim 1, wherein at least one of the first system boards or at least one of the second system boards is an input/output board.

6. An apparatus comprising:
a plurality of first system boards, each of the first system boards including a first port, a second port, and a first processor that sends a first request through the first port and a second request identical to the first request through the second port respectively, and the plurality of the first system boards are mirrored;
a plurality of second system boards including a third port, a fourth port, and a second processor that sends a third request through either of the third and fourth ports, and the plurality of the second system boards are not mirrored;
a first transfer device, connected to the first port of each of the first system boards and the third port of each of the second system boards, having a first arbiter that selects first request sent from the first port of the first system boards or the third request sent from the third port of the second system boards, and that outputs the selected first or the selected third request; and
a second transfer device, connected to the second port and the fourth port, that transfers requests, having a second arbiter that selects the second request sent from of the second port of the first system boards or the third request sent from the third port of the second system boards, and that outputs the selected second or the selected third request in synchronization with the selected first request or the selected third request by the first arbiter when the request selected by the second arbiter, being sent from the first system boards.

7. The apparatus of claim 6, wherein the first arbiter outputs the selected first request or the selected third request to the mirrored first system boards and the mirrored second system boards.

8. The apparatus of claim 7, wherein the mirrored first system boards constitute a mirrored partition.

9. The apparatus of claim 7, wherein the second system boards constitute a non-mirrored partition.

10. The apparatus of claim 6, wherein one of the first system boards or the one of the second system boards is an input/output board.

11. The apparatus of claim 6, further comprising a timer that outputs a signal by measuring a predetermined period.

12. The apparatus of claim 11, wherein the first arbiter and the second arbiter outputs the selected request in synchronization with the signal outputted by the timer.

13. A method of controlling an apparatus including a plurality of mirrored first system boards and a plurality of non-mirrored system boards, the method comprising:

outputting a first request through a first port and a second request identical to the first request through a second port included in a plurality of first system boards, respectively;

outputting a third request through either of a third and fourth port included in a plurality of second system boards;

selectively receiving the first request sent from the first port of one of the first system boards;

outputting the received first request through a first arbiter included in a first transfer device to at least one of the first ports of the first system boards;

selectively receiving the third request sent from the third port of one of the second system boards;

outputting the received third request through a second arbiter included in the first transfer device to at least one of the third ports of the second system boards;

selectively receiving the second request sent from the second port of one of the first system boards;

outputting the received second request through a third arbiter included in a second transfer device to at least one of the second ports of the first system boards in synchronization with outputting the first request from the first arbiter;

selectively receiving the third request sent from the fourth ports of one of the second system boards; and outputting the received third request through a fourth arbiter included in the second transfer device to at least one of the fourth ports of the second system boards.

14. The method of claim 13, wherein the selected request outputted from the first arbiter is sent to the mirrored first system boards.

15. The method of claim 13, wherein the selected request outputted from the third arbiter is sent to the mirrored first system boards.

* * * * *